UNITED STATES PATENT OFFICE.

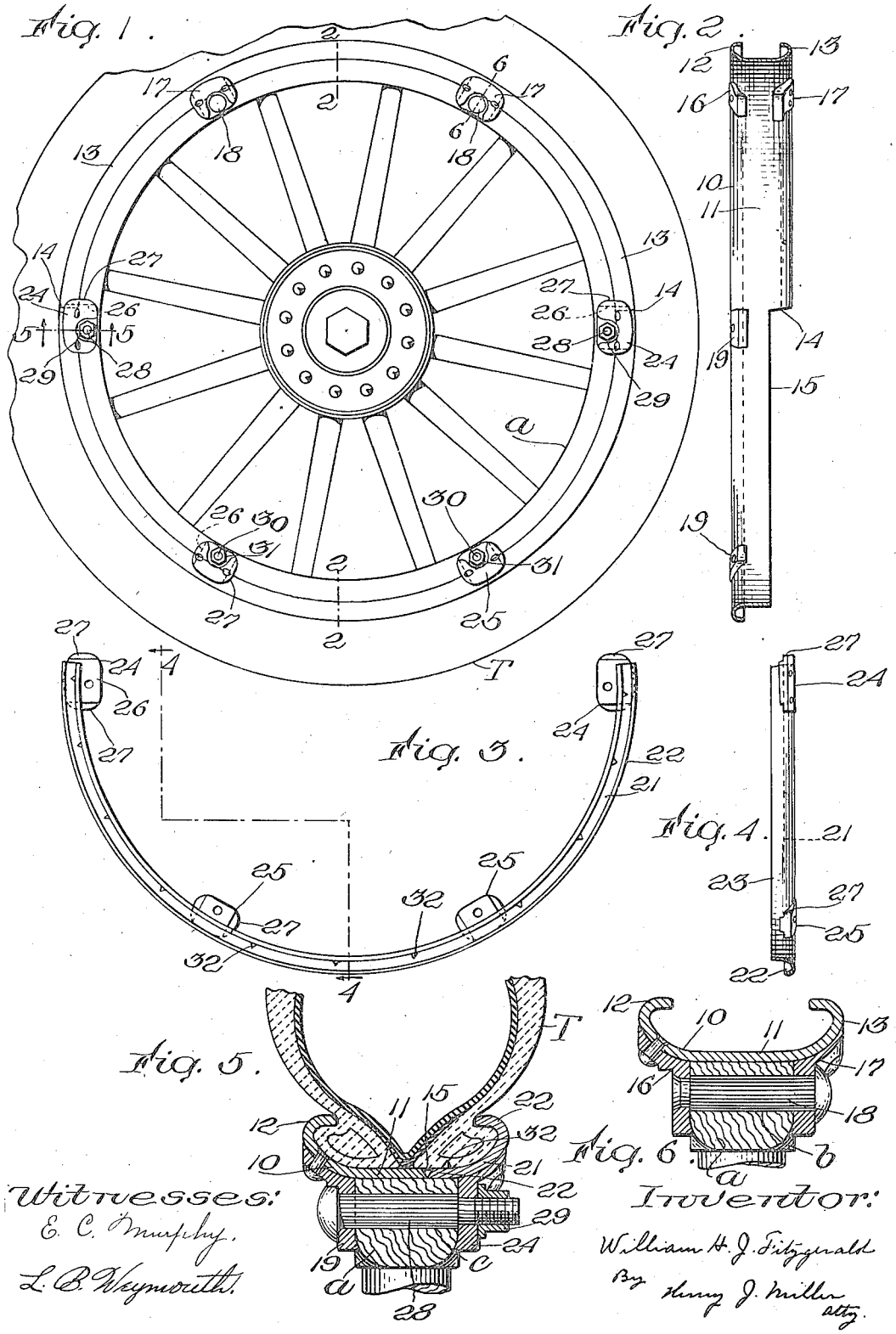

WILLIAM H. J. FITZGERALD, OF BRAINTREE, MASSACHUSETTS, ASSIGNOR TO EDWIN P. BROWN, OF NEWTON, MASSACHUSETTS.

WHEEL-TIRE.

1,152,160.  Specification of Letters Patent.  Patented Aug. 31, 1915.

Application filed November 22, 1913. Serial No. 802,405.

*To all whom it may concern:*

Be it known that I, WILLIAM H. J. FITZGERALD, a citizen of the United States, residing at Braintree, in the county of Norfolk and State of Massachusetts, have invented certain new and useful Improvements in Wheel-Tires, of which the following is a specification, reference being had to the accompanying drawings, forming part thereof.

This invention has reference to improvements in wheel rims or similar devices for securing a tire detachably upon a wheel and comprises a holder adapted to be mounted on a wheel and having complemental means between which the tire may be retained in ordinary use.

The object of the invention is to so construct a wheel rim or similar device that the operation of removing the tire or tire shoe therefrom or the replacement of the tire or tire shoe may be facilitated and that the tire or shoe may be more effectually secured upon the wheel.

The invention consists in the novel wheel rim having the detachable segmental section.

The invention also consists in such other novel features of construction and combination of parts as shall hereinafter be more fully described and pointed out in the claim.

Figure 1, represents a side elevation of a wheel having the improved wheel rim, parts of the tire thereon being broken away. Fig. 2, represents a sectional view of a member or section of the wheel rim (the fixed section so called) removed from the wheel, this view appearing as if taken on line 2—2 Fig. 1 the parts of the wheel and the tire being removed. Fig. 3, represents a view of the detachable section of the wheel rim reversed from that shown in Fig. 1. Fig. 4, represents a sectional view taken on line 4—4 Fig. 3. Fig. 5, represents an enlarged sectional view of portions shown in Fig. 1 as taken on line 5—5 on said figure. Fig. 6, represents a similar view as taken on line 6—6 Fig. 1.

Similar characters of reference designate corresponding parts throughout.

In carrying this invention into practice I prefer to apply the improved tire holding rim or device to a wheel having the felly $a$ furnished with the transverse bolt holes as $b$ and $c$ which are thus identified as they relate to bolts or nuts differing somewhat in construction.

Mounted on the periphery of the felly $a$ is the rim section 10 having the felly embracing web or member 11 and the tire holding or engaging lips or flanges 12 and 13; a segmental portion of the lip 13 and the adjoining portion of its web 11 is cut away to form, on said rim section 10, the shoulders 14, 14 and the edge 15. Fixed to the outer portions of said lips or flanges 12 and 13 by means of rivets or in any other well known manner are the perforated lugs 16 and 17 the perforations of which are in registry with the bolt holes as $b$ of the felly $a$; these lugs 16 and 17 have a sectional shape substantially as shown in Fig. 6 of the drawing and form braces fitting the faces of the wheel felly $a$ and the rim and said lugs 16 and 17 are preferably permanently secured to said felly $a$ by the rivets 18, 18 which extend through the perforations of said lugs 16 and 17 and through said bolt holes as $b$ of the wheel felly $a$ as is shown in said Fig. 6. Additional perforated lugs 19, 19 and 20, 20 are secured to the lip 12 of said rim section 10 and have their perforations in registry with the bolt holes as $c$ of the wheel felly, the lugs 19, 19 being positioned in line with the shoulders 14, 14 of said rim section while the lugs 20, 20 are positioned on said lip 12 opposite the edge 15 of said rim section 10.

Adapted to closely fit between the shoulders 14, 14 of rim section 10 and against its edge 15 is the detachable segmental rim section 21 having the tire holding lip 22 which is complemental to and, when in place, forms an extension of said lip 13 of rim section 10 and has the web member 23 adapted to be received against the periphery of the felly $a$. This detachable rim section 21 has secured to the outer surface of its tire holding lip 22 the perforated lugs 24, 24 and 25, 25 the perforations of which are adapted, when said rim section 21 is in place to register with the corresponding perforations of lugs 19, 19 and 20, 20 of rim section 10. These lugs 24, 24 and 25, 25 are similar in shape but differ as to location each of them having the base 26, adapted to bear against the face of the wheel felly $a$, and the ears 27, 27 which extend beyond said base 26 and are adapted to be engaged by a tool placed between one of said ears and the wheel felly to assist in the removal of said rim section 21 from the wheel.

The bases 26, 26 of the lugs 24, 24 are so placed on rim section 21 that said bases 26 are adapted to overlap the joints between the ends of rim section 21 and the shoulders 14, 14 of rim section 10 so that when said lugs 24, 24 are received by their bolts 28, 28 and are secured by their nuts 29, 29 the ends of rim section 21 and said shoulders 14, 14 are bridged by said bases 26, 26 of lugs 24, 24 and certain of said ears 27, 27 of said lugs 24, 24 extend beyond the line of juncture between said detachable rim section 21 and the fixed rim section 10 of which shoulders 14, 14 are parts. Bolts 30, 30 extend through the perforations of lugs 25, 25 and are provided with nuts 31, 31 adapted, by being screwed on to their bolts, to force the lugs 25, 25 against the face of wheel felly $a$ and at the same time to force the rim section inward on said felly toward edge 15 of rim section 10.

Rim section 21 is herein shown as having the spurs 32, 32 which are adapted to engage with the base portion of a tire whereby when said rim section 21 is removed from the wheel said spurs act to draw with them the tire thus engaged.

The tire or tire shoe T may be of any known shape or construction and the tire holding lips or members may be of any shape and construction adapted under the ordinary conditions of use to hold the tire or tire shoe from lateral displacement from the wheel. The wheel also may be of any known construction adapted to receive a wheel rim of this nature. In mounting a tire on this improved rim the base portion of said tire is first introduced between the tire holding lips 12 and 13 preferably starting such operation at one of the shoulders 14 and continuing until the other of said shoulders is reached, the base portion of the tire is now forced over the web portion 11, of rim section 10, having the edge 15 until said tire is sufficiently in place to permit the placing of lugs 24, 24 and 25, 25 of rim section 21 on their respective bolts 28, 28 and 30, 30. The nuts 29, 29 and 31, 31 are then applied to their respective bolts and are screwed into place thus forcing the rim section 21 into place between the shoulders 14, 14 of the fixed rim section and the web 23 of said rim section 21 onto the periphery of the wheel felly.

The removal of the tire from the rim is effected by reversing the operation just above described and, in such removal operation it will be seen that if drawing off force is applied to one or both of the lugs 25, 25, rim section may swing outward as on an axis defined by the line of bearing between lugs 24, 24 and the felly $a$ and rim section 10, said axis being transverse to the general extension of rim section 21 and thus said rim section 21 is, in effect, hinged on said axis or line of deflection.

As the web portion 22 of rim section 21 fills the space between wheel felly and the tire it is evident that when said rim section is removed a clearance is afforded between said felly and the tire while portions of the tire are sustained out of contact with the wheel felly by the thickness of the web 11 at the shoulders 14, 14; such clearance facilitates the removal of the tire.

Having thus described my invention I claim as new and desire to secure by Letters Patent.

A device for securing a tire detachably upon a wheel comprising an annular web having a pair of circumferentially extending tire holders one of which has a removable segmental member complemental to its related member, said removable member having a web portion adapted to fit the periphery of the wheel felly, lugs secured to said tire holders, two of said lugs on said removable member overlapping the ends of the complemental segmental member, and bolts for securing said lugs together in pairs.

WILLIAM H. J. FITZGERALD.

Witnesses:
   HENRY J. MILLER,
   ESTHER C. MURPHY.